(12) United States Patent
Prabhudesai et al.

(10) Patent No.: US 11,232,561 B2
(45) Date of Patent: Jan. 25, 2022

(54) CAPTURE AND STORAGE OF MAGNIFIED IMAGES

(71) Applicant: Applied Materials, Inc., Santa Clara, CA (US)

(72) Inventors: Parijat P. Prabhudesai, Goa (IN); Ganesh Kumar Mohanur Raghunathan, Bangalore (IN); Aditya Sista, Bangalore (IN); Sumit Kumar Jha, Jharkhand (IN); Narasimha Murthy Chandan, Bangalore (IN)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/746,569

(22) Filed: Jan. 17, 2020

(65) Prior Publication Data

US 2020/0234441 A1 Jul. 23, 2020

Related U.S. Application Data

(60) Provisional application No. 62/795,467, filed on Jan. 22, 2019.

(51) Int. Cl.
*G06T 7/00* (2017.01)
*G06T 7/143* (2017.01)
*G06T 7/11* (2017.01)

(52) U.S. Cl.
CPC .............. *G06T 7/0012* (2013.01); *G06T 7/11* (2017.01); *G06T 7/143* (2017.01); *G06T 2207/30024* (2013.01)

(58) Field of Classification Search
None
See application file for complete search history.

(56) References Cited

U.S. PATENT DOCUMENTS 7,139,415 B2 11/2006 Finkbeiner
7,826,977 B2 11/2010 Garty et al.
(Continued)

FOREIGN PATENT DOCUMENTS

JP H06-004601 1/1994
WO WO 03/105675 12/2003
(Continued)

OTHER PUBLICATIONS

PCT International Search Report and Written Opinion in International Application No. PCT/US2020/014156, dated May 11, 2020, 12 pages.
(Continued)

*Primary Examiner* — Vu Le
*Assistant Examiner* — Courtney Joan Nelson
(74) *Attorney, Agent, or Firm* — Fish & Richardson P.C.

(57) ABSTRACT

An imaging system includes a microscope to generate magnified images of regions of interest of a tissue sample, a camera to capture and store the magnified images, and a controller. The controller is configured to, for each magnification level in a sequence of increasing magnification levels, image one or more regions of interest of the tissue sample at the current magnification level. For each region of interest, data is generated defining one or more refined regions of interest based on the magnified image of the region of interest of the tissue sample at the current magnification level. Each refined region of interest corresponds to a proper subset of the tissue sample, and the refined regions of interest of the tissue sample provide the regions of interest to be imaged at a next magnification level from the sequence of increasing magnification levels.

15 Claims, 4 Drawing Sheets

(56) References Cited

U.S. PATENT DOCUMENTS

| | | | |
|---|---|---|---|
| 8,116,543 B2* | 2/2012 | Perz | G06K 9/0014 |
| | | | 382/128 |
| 9,029,159 B2 | 5/2015 | Furrer et al. | |
| 9,494,521 B2 | 11/2016 | Holmes et al. | |
| 2001/0050999 A1* | 12/2001 | Bacus | G06T 7/0012 |
| | | | 382/128 |
| 2018/0031817 A1 | 2/2018 | Barral | |
| 2018/0232883 A1 | 8/2018 | Sethi et al. | |
| 2019/0005304 A1 | 1/2019 | Adalsteinsson et al. | |

FOREIGN PATENT DOCUMENTS

| | | | |
|---|---|---|---|
| WO | WO-03105675 A2 * | 12/2003 | G06T 7/0012 |
| WO | WO 2018/231204 | 12/2018 | |

OTHER PUBLICATIONS

Liu et al., "Microfluidic device as a new platform for immunofluorescent detection of viruses," Lab on a Chip, 2005, 5(11):1327-30.
Office Action in European Appln. No. 20745059.4, dated Aug. 31, 2021, 3 pages.

* cited by examiner

CAPTURE AND STORAGE OF MAGNIFIED IMAGES

CROSS-REFERENCE TO RELATED APPLICATIONS

This application claims priority to U.S. Provisional Application Ser. No. 62/795,467, filed on Jan. 22, 2019, the disclosure of which is incorporated by reference.

BACKGROUND

This specification relates to capturing and storing magnified images generated by a microscope.

A microscope can generate magnified images of a sample at any of a variety of magnification levels. The "magnification level" of an image refers to a measure of how large entities (e.g., cells) depicted in the image appear compared to their actual size. At higher magnification levels, a higher resolution image or a larger number of discrete images may be required to capture the same area of the sample as a single image at a lower magnification level, thus requiring more space in a memory during storage.

Magnified images of a tissue sample can be analyzed by a pathologist to determine if portions (or all) or the tissue sample are abnormal (e.g., cancerous). A pathologist can analyze magnified images of a tissue sample by viewing portions of the tissue sample which appear to be abnormal at higher magnification levels.

SUMMARY

This specification describes an imaging system implemented as computer programs on one or more computers in one or more locations that can efficiently capture and store magnified images of a sample that are generated by a microscope.

According to a first aspect there is provided an imaging system that includes a microscope to generate magnified images of regions of interest of a tissue sample, a camera to capture and store the magnified images generated by the microscope, and a controller. The controller is configured to, for each magnification level in a sequence of increasing magnification levels, image one or more regions of interest of the tissue sample at the current magnification level. This includes, for each region of interest, using the microscope to generate a magnified image of the region of interest of the tissue sample at the current magnification level, using the camera to capture and store the magnified image of the region of interest of the tissue sample at the current magnification level, and generating data defining one or more refined regions of interest based on the magnified image of the region of interest of the tissue sample at the current magnification level. Each refined region of interest corresponds to a proper subset of the tissue sample, and the refined regions of interest of the tissue sample provide the regions of interest to be imaged at a next magnification level from the sequence of increasing magnification levels.

In another aspect, a method performed by one or more data processing apparatus includes, for each magnification level in a sequence of increasing magnification levels, imaging one or more regions of interest of a tissue sample at the current magnification level. This includes, for each region of interest: using a microscope to generate a magnified image of the region of interest of the tissue sample at the current magnification level, using a camera to capture and store the magnified image of the region of interest of the tissue sample at the current magnification level, and generating data defining one or more refined regions of interest based on the magnified image of the region of interest at the current magnification level. Each refined region of interest corresponds to a proper subset of the tissue sample, and the refined regions of interest of the tissue sample provide the regions of interest to be imaged at a next magnification level from the sequence of increasing magnification levels.

In another aspect, a non-transitory computer-readable storage media is encoded with instructions that when executed by one or more computers cause the one or more computers to perform operations including, for each magnification level in a sequence of increasing magnification levels, imaging one or more regions of interest of a tissue sample at the current magnification level. This includes, for each region of interest: using a microscope to generate a magnified image of the region of interest of the tissue sample at the current magnification level, using a camera to capture and store the magnified image of the region of interest of the tissue sample at the current magnification level, and generating data defining one or more refined regions of interest based on the magnified image of the region of interest at the current magnification level. Each refined region of interest corresponds to a proper subset of the tissue sample, and the refined regions of interest of the tissue sample provide the regions of interest to be imaged at a next magnification level from the sequence of increasing magnification levels.

Implementations of any of the above aspects may include one or more of the following features.

Each refined region of interest may be included in the region of interest. Generating data defining one or more refined regions of interest may include processing the magnified image of the region of interest of the tissue sample at the current magnification level using a detection model to generate data defining the one or more refined regions of interest. The detection model may be configured to generate data defining refined regions of interest corresponding to portions of the tissue sample that are predicted be cancerous. The detection model may include one or more neural networks. For each particular magnification level in the sequence of increasing magnification levels, the controller may use a particular detection model that is specialized to process magnified images at the particular magnification level. Imaging a region of interest of the tissue sample may include storing data defining a location of the region of interest in the tissue sample. Using the microscope to generate a magnified image of the region of interest may include adjusting: (i) a position of a stage of the microscope, (ii) a magnification setting of the microscope, or (iii) both, to cause the microscope to generate a magnified image of the region of interest of the tissue sample at the current magnification level.

Particular embodiments of the subject matter described in this specification can be implemented so as to realize one or more of the following advantages.

The imaging system described in this specification can be used to efficiently capture and store magnified images of a sample (e.g., a tissue sample) that are generated using a microscope. In particular, rather than capturing and storing magnified images of the entire sample, the system can capture and store magnified images of respective regions of interest of the sample at different magnification levels. Since the regions of interest of the sample may correspond to only a small fraction of the entire sample, magnified images of the regions of interest of the sample may occupy substantially less space in memory during storage than would be occupied by magnified images of the entire sample. Moreover, the imaging system described in this specification may have a higher throughput (e.g., measured in samples processed per hour) than conventional imaging systems that capture and store magnified images of the entire sample at each magnification level.

The imaging system described in this specification can process a magnified image of a region of interest of a sample that is captured at a given magnification level to determine "refined" regions of interest to be imaged at higher magnification levels. For example, if the sample is a tissue sample, the system can determine refined regions of interest that correspond to portions of the tissue sample that are predicted to be "abnormal" (e.g., cancerous). In this example, the system only captures and stores images of regions of interest of the tissue sample at higher magnifications if they are predicted to be abnormal based on images of the tissue sample captured at lower magnifications. In this manner the system can refrain from capturing and storing high magnification images of portions of the tissue sample which are likely to be irrelevant to subsequent analysis of the tissue sample performed by a pathologist. Since high magnification images are computationally intensive to store and transmit, the system described in this specification can substantially reduce computational resource consumption relative to conventional imaging systems that are configured to capture high magnification images of entire tissue samples.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
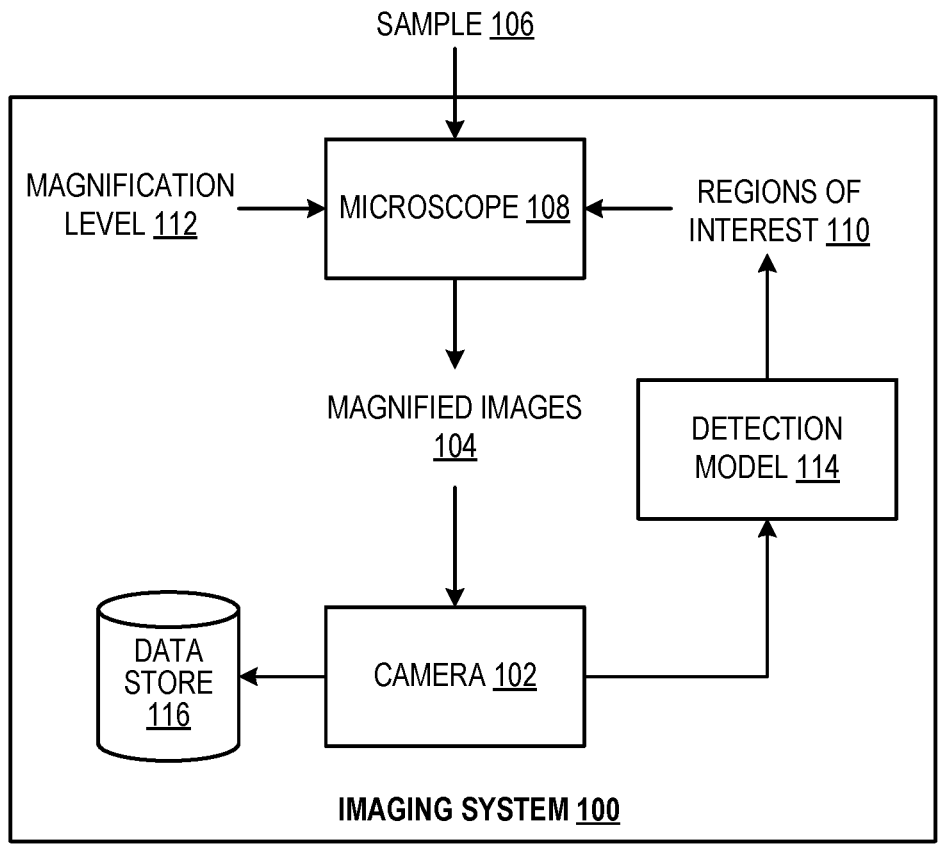
FIG. 1 is a block diagram of an example imaging system.

FIG. 1 shows an example imaging system 100. The imaging system 100 is an example of a system implemented as computer programs on one or more computers in one or more locations in which the systems, components, and techniques described below are implemented.

The imaging system 100 uses a camera 102 to capture and store magnified images 104 of a sample 106 (e.g., a tissue sample) that are generated using a microscope 108. The system 100 generates magnified images 104 of respective regions of interest 110 of the sample 106 at different magnification levels 112. As will be described in more detail below, the system 100 can process a magnified image 104 of a region of interest 110 captured at a given magnification level 112 to determine one or more "refined" regions of interest 110 to be imaged at higher magnification levels 112.

The sample 106, which may be mounted on a microscope slide, can be a specimen of any kind of material. For example, the sample 106 may be a tissue sample that includes a collection of cells obtained from the body of a person. In this example, the regions of interest 110 of the tissue sample may correspond to portions of the tissue sample that are predicted to be "abnormal" (e.g., cancerous), and the magnified images 104 generated by the system 100 may be provided to a pathologist for subsequent analysis.

The microscope 108 can be any appropriate kind of microscope that can generate magnified images 104 of the sample 106 at different magnification levels 112. For example, the microscope 108 may be an optical microscope that generates magnified images 104 of the sample 106 using one or more lenses. The "magnification level" of an image refers to a measure of how large entities (e.g., cells) depicted in the image appear compared to their actual size.

The camera 102 can be any appropriate kind of sensor array, e.g., a CCD sensor, that can "capture" (i.e., generate digital representations of) the magnified images 104 generated by the microscope 108. For example, the camera 102 may be configured to capture the magnified images 104 generated by the microscope 108 as color images (e.g., using a red-green-blue (RGB) color representation). The camera 102 and microscope 108 can be part of a medical slide scanner.

The system 100 images respective regions of interest 110 of the sample 106 at each magnification level 112 in a sequence of increasing magnification levels. For example, the sequence of increasing magnification levels may be given by: [5×, 10×, 20×, 40×], or any other appropriate sequence of increasing magnification levels. The system 100 may image the entire sample 106 at the first (i.e., lowest) magnification level in the sequence of increasing magnification levels. Thereafter, the system 100 can use a detection model 114 to determine the regions of interest 110 of the sample 106 to be imaged at each subsequent (i.e., higher) magnification level 112 in the sequence of increasing magnification levels. The detection model 114 is configured to process a digital representation of a magnified image 104 of a given region of interest 110 at a given magnification level 112 to generate data defining one or more "refined" regions of interest 110. Subsequently, the system 100 images the refined regions of interest at the next magnification level after the given magnification level in the sequence of increasing magnification levels.

The detection model 114 can be any computer-implemented model that can process a magnified image 104 of a region of interest 110 of the sample 106 to generate data defining one or more refined regions of interest of the sample 106. In one implementation, the sample 106 may be a tissue sample and the detection model 114 may be configured to generate data defining refined regions of interest corresponding to portions of the tissue sample which are predicted to be abnormal (e.g., cancerous). In this implementation, the system 100 generates magnified images 104 at each magnification level 112 that are predicted, based on magnified images 104 generated at the previous magnification level 112, to depict portions of the tissue sample which are abnormal (e.g., cancerous). Examples of detection models 114 are described in more detail with reference to FIG. 3.

The system 100 can store digital representations of the magnified images 104 of the regions of interest 110 of the sample 106 that are generated by the camera 102 in a data store 116. The data store 116 may be, for example, a physical data storage device or a logical data storage area. The system 100 additionally stores data defining the locations (e.g., in a frame of reference of the sample 106) of each of the imaged regions of interest 110. For example, if the regions of interest 110 are rectangular in shape, the system 100 may store data defining the coordinates (e.g., in a frame of reference of the sample 106) defining the locations of the corners of the (rectangular) regions of interest.

The system 100 may generate, capture, and store the magnified images 104 of the respective regions of interest 110 of the sample 106 at each magnification level 112 in a partially or entirely automated manner (i.e., with little or no human intervention) using a computer-implemented controller. For example, the controller may cause the microscope 108 to generate a magnified image 104 of a region of interest 110 at a given magnification level 112 by automatically adjusting: (i) the position of the stage of the microscope 108, (ii) the magnification setting of the microscope 108, or (iii) both. Thereafter, the controller can use the camera 102 to capture the magnified image 104, and automatically transmit the magnified image 104 to the data store 116 and the detection model 114 (i.e., for further processing to determine refined regions of interest). The controller can be implemented using any appropriate hardware or software, some of which may be located remotely from other parts of the system 100.

Figure 2:
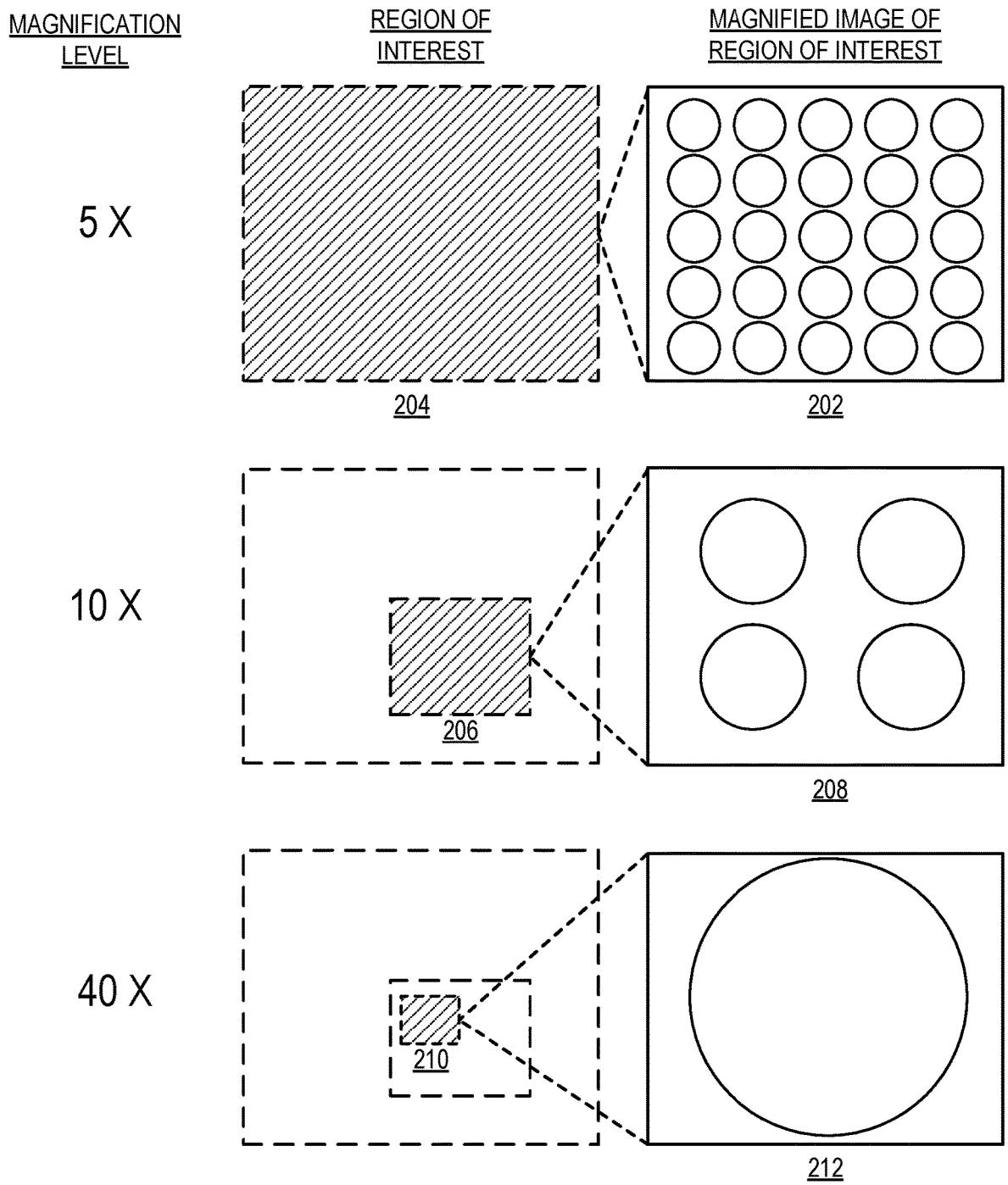
FIG. 2 illustrates example magnified images of regions of interest of a sample at different magnification levels.

FIG. 2 illustrates example magnified images of regions of interest of a sample at different magnification levels. In particular, the magnified image 202 depicts a rectangular region of interest 204 of the sample at a magnification level of 5×. The imaging system (as described with reference to FIG. 1) can process the magnified image 202 using a detection model to generate data defining the refined region of interest 206 (i.e., which is a proper subset of the region of interest 204). The imaging system can subsequently generate a magnified image 208 of the region of interest 206 at magnification level 10×. The imaging system can process the magnified image 208 using the detection model to generate data defining the refined region of interest 210 (i.e., which is a proper subset of the region of interest 206). The imaging system can subsequently generate a magnified image 212 of the region of interest 210 at magnification level 40×. In the example depicted in FIG. 2, the imaging system may capture and store only the magnified images 202, 208, and 212 of the respective regions of interest 204, 206, and 210, rather than capturing and storing magnified images of the entire sample at each magnification level.

Figure 3:
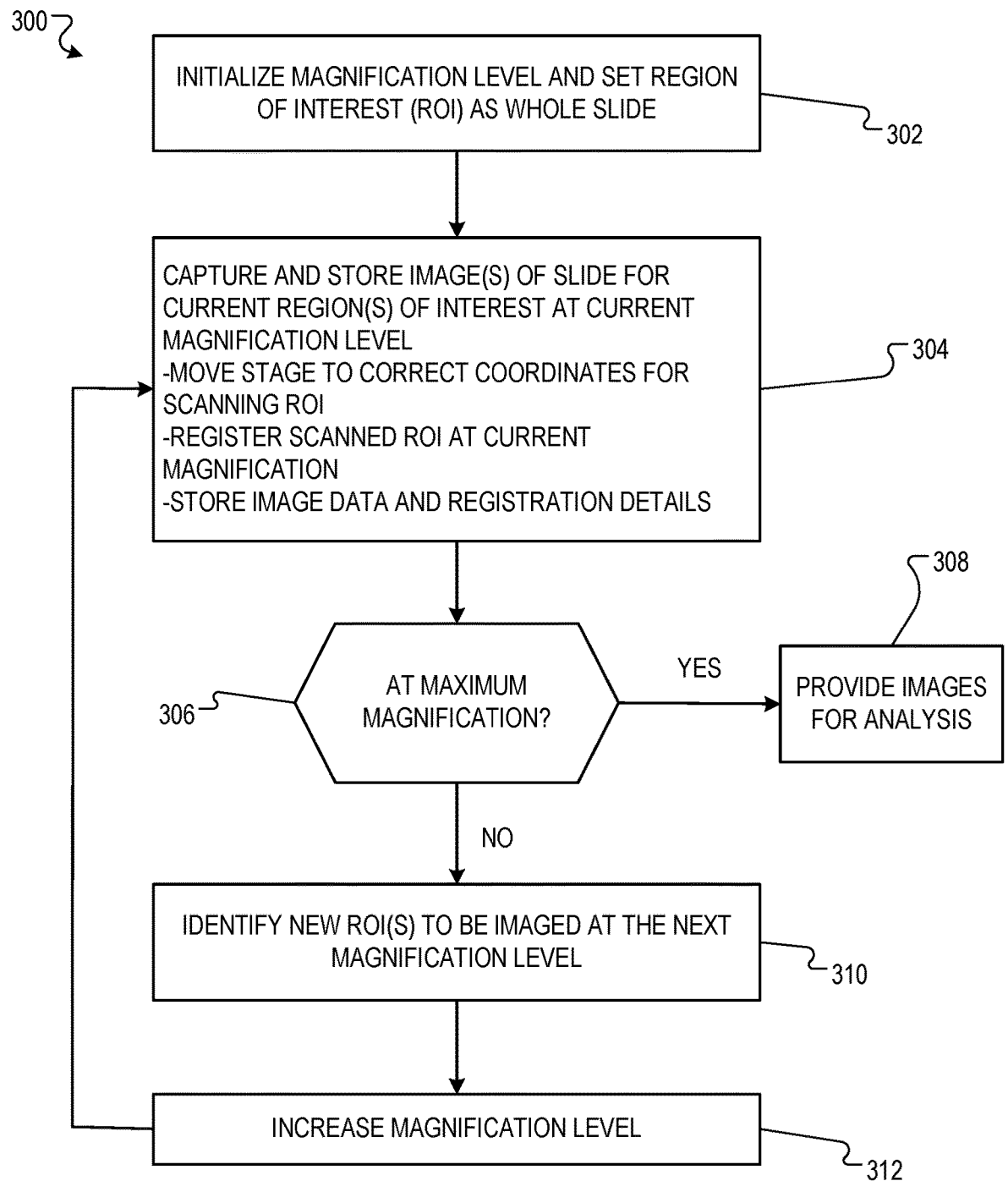
FIG. 3 is a flow diagram of an example process for imaging respective regions of interest of a sample at each magnification level in a sequence of increasing magnification levels.

FIG. 3 is a flow diagram of an example process 300 for imaging respective regions of interest of a sample at each magnification level in a sequence of increasing magnification levels. For convenience, the process 300 will be described as being performed by a system of one or more computers located in one or more locations. For example, an imaging system, e.g., the imaging system 100 of FIG. 1, appropriately programmed in accordance with this specification, can perform the process 300.

In particular, the system identifies one or more regions of interest of the sample to be imaged at a current magnification level. If the current magnification level is the first (i.e., lowest) magnification level in the sequence, the system can identify a predetermined region of interest to be imaged at the current magnification level. For example, the system can identify a region of interest corresponding to the entire sample to be imaged at the current magnification level. If the current magnification level is after the first magnification level in the sequence, the system can image a refined region of interest. The refined region of interest can be obtained by analysis of the image obtained during a previous iteration of the process.

Initially, the entire slide is set as the region of interest, and the magnification level is set so that the camera can image the entire slide (302).

The process 300 then enters an iterative process where each iteration corresponds to a respective magnification level in a sequence of increasing magnification levels. The first iteration of the process 300 corresponds to a first (i.e., lowest) magnification level in the sequence, and each subsequent iteration corresponds to the next highest magnification level in the sequence, as will be described in more detail below.

The system uses a camera to capture and store the respective image of each identified region of interest of the sample at the current magnification level (304). For example, for each identified region of interest, the system can adjust the position of the microscope stage to cause the microscope to generate an image of the region of interest at the current magnification level. This can include moving the stage to coordinates identified for each region of interest (e.g., to center the respective region of interest at the center of the field of view of the camera).

The camera can capture a magnified image generated by the microscope by generating a digital representation of the magnified image in any appropriate format. For example, the camera may generate a digital representation of a magnified image in an RGB color representation, where each pixel of the digital representation of the magnified image is associated with a vector defining respective red, green, and blue color values for the pixel. The system can store the respective magnified images of the identified regions of interest in a data store, for example, a physical data storage device or a logical data storage area. For each identified region of interest of the sample at the current magnification level, the system additionally stores data associating the magnified image of the region of the interest with data defining the location (e.g., in a frame of reference of the sample) of the region of interest.

The system determines whether a termination criterion is satisfied (306). For example, the system may determine the termination criterion is satisfied if the current magnification level is a predetermined maximum magnification level. As another example, the system may determine the termination criterion is satisfied if the cumulative volume of data (e.g., measured in megabytes (MB)) stored in the data store as of the current iteration has met or exceeded a predetermined threshold.

If the system determines that a termination criterion is satisfied, the system can provide the magnified images of the respective regions of interest that were captured and stored at each iteration of the process 300 for subsequent analysis and processing (308). For example, if the sample is a tissue sample and the magnified images of the respective regions of interest depict portions of the tissue sample that are predicted to be abnormal (e.g., cancerous), then the system may provide the magnified images to a pathologist. In a telemedicine environment, the pathologist may be located remotely from the system, and the system may provide the magnified images of the respective regions of the tissue sample to the pathologist over a data communication link (e.g., the Internet). In some implementations, the system may provide images over the data communications link as the images are obtained (e.g., not waiting until regions of interest within an image are identified before sending that image).

If the system determines that the termination criterion is not satisfied, the system generates data defining one or more refined regions of interest based on the images of the regions of interest of the sample at the current magnification level (310). These refined regions of interest will be imaged at the next magnification level.

In particular, for each image of a region of interest of the sample at the current magnification level, the system may process the image using a detection model to generate one or more corresponding refined regions of interest. The refined regions of interest of the tissue sample provide the regions of interest to be imaged at the next magnification level in the sequence of increasing magnification levels (i.e., at the next iteration of the process 300). In some cases, each refined region of interest that is generated by processing a magnified image of a given region of interest of the sample at the current magnification level corresponds to a proper subset of the sample, and in particular, is a subset of the given region of interest.

The detection model may be, for example, a machine learning model (e.g., a linear model, support vector machine model, random forest model, or neural network model) that is trained to generate data defining refined regions of interest having certain properties. In a particular example, the sample may be a tissue sample and the machine learning model may be trained to generate data defining refined regions of interest corresponding to portions of the tissue sample which are predicted to be abnormal (e.g., cancerous). A few examples follow.

In one implementation, the detection model may be a machine learning model that is trained to generate a respective probability value for each pixel of a magnified image of a region of interest of the tissue sample at the current magnification level. The probability value generated by the detection model for a pixel may represent a likelihood that the pixel corresponds to an abnormal portion of the tissue sample. The system may generate data defining refined regions of interest of the tissue sample by determining the coordinates of bounding boxes where the corresponding probability values of the pixels enclosed by each of the bounding boxes have a measure of central tendency (e.g., an average) that exceeds a predetermined threshold. The detection model may be trained based on training examples which each specify: (i) a training magnified image depicting a region of a tissue sample, and (ii) labels defining whether each pixel of the training magnified image corresponds to an abnormal portion of the tissue sample.

In another implementation, the detection model may be a machine learning model that is trained to generate data defining the coordinates of bounding boxes enclosing portions of a magnified image of a region of the tissue sample at the current magnification level. Each bounding box may be predicted to correspond to an abnormal portion of the tissue sample, and the system may determine each generated bounding box to define a respective refined region of interest of the tissue sample. The detection model may be trained based on training examples which each specify: (i) a training magnified image depicting a region of a tissue sample, and (ii) coordinates defining bounding boxes that correspond to abnormal portions of the tissue sample.

The system may use a different detection model to process magnified images of regions of interest of the sample at different magnification levels. That is, the system may use a different detection model at each iteration of the process 300. For example, the system may use a first machine learning model having a first set of parameter values to process magnified images at a first magnification level, and a second machine learning model having a second set of parameter values to process magnified images at a second magnification level. In this example, the first set of parameter values may be determined by training the first machine learning model based on training examples which include training magnified images at the first magnification level.

Similarly, the second set of parameter values may be determined by training the second machine learning model based on training examples which include training magnified images at the second magnification level. By using detection models that are specialized to process magnified images at different magnification levels, the system may generate refined regions of interest which are more accurate than if the system used a single detection model to process magnified images at every magnification level.

The system may pre-process the magnified images of the regions of interest of the sample before processing them using the detection model to generate the refined regions of interest. In one example, the sample may be a tissue sample and the system may pre-process the magnified images of the regions of interest of the tissue sample using stain normalization techniques. A stain normalization technique refers to a numerical method for modifying images of tissue samples to reduce variations in the appearance of the images due to staining agents applied to the tissue samples.

In some cases, the system may determine that one or more of the regions of interest at the current magnification level should not be imaged further at higher magnification levels. For example, the sample may be a tissue sample and the detection model may generate respective probability values for each pixel of a magnified image of a given region of interest which indicate that the given region of interest likely corresponds to a normal portion of the tissue sample. If the system determines that none of the regions of interest at the current magnification level should be imaged further at higher magnification levels, the process 300 may terminate.

The regions of interest of the sample can have any appropriate shape, for example, a rectangular shape or a circular shape. Data defining a region of interest of the sample can be represented in any appropriate format. For example, if a region of interest has a rectangular shape, the data defining the region of interest may include the coordinates (e.g., in a frame of reference of the sample) of the corners of the rectangular region of interest.

After or concurrently with identification of the new regions of interest, the magnification level can be increased to the next level, e.g., the microscope magnification setting is set using robotic actuators (312). The process then proceeds with capturing and storing the images of the region of interest at the new magnification level (returning to 304).

For convenience, the process 300 describes the imaging system as imaging regions of interest of the sample in order of increasing magnification level. More specifically, the process 300 describes how each region of interest corresponding to a lower magnification level is imaged before each region of interest corresponding to a higher magnification level. More generally, the system can image the regions of interest in any appropriate order. For example, the system could use a hierarchical tree approach.

Figure 4:
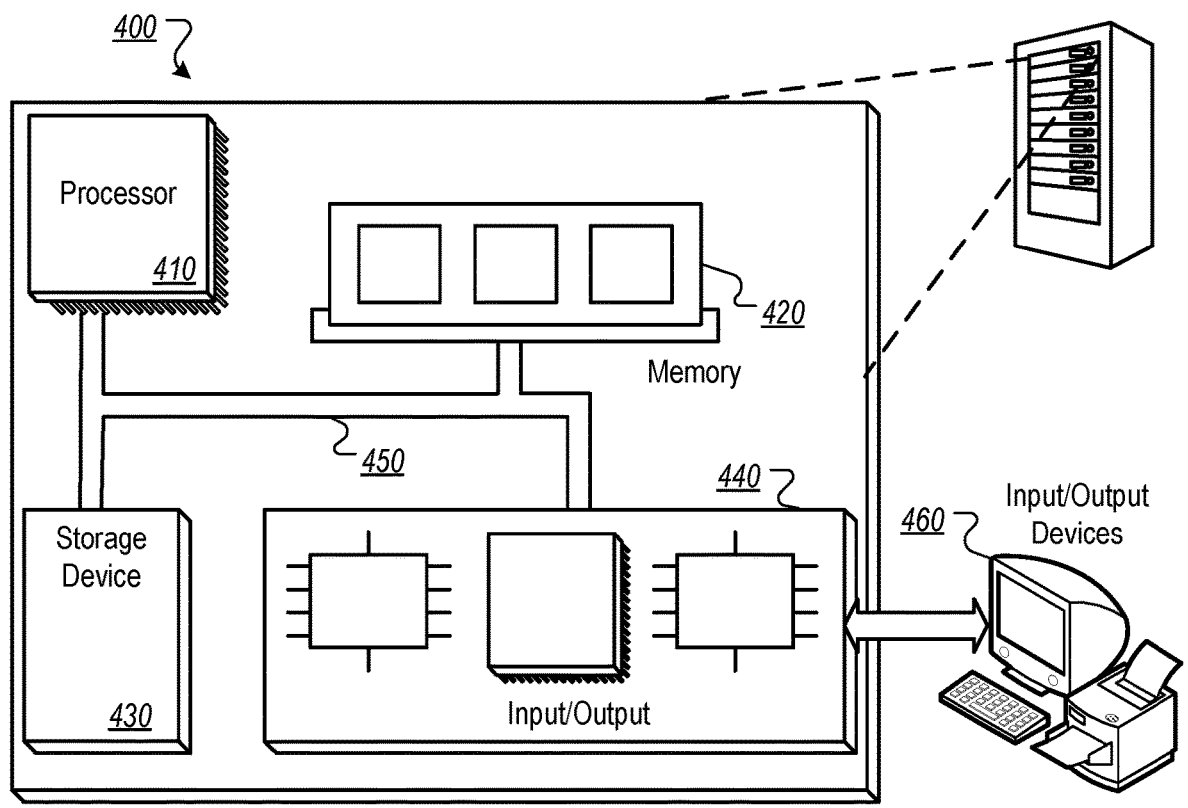
FIG. 4 is a block diagram of an example computing system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An imaging system, comprising:
a microscope to generate magnified images of regions of interest of a tissue sample;
a camera to capture and store the magnified images generated by the microscope;
a memory that stores data defining a plurality of detection machine learning models,
wherein each detection machine learning model is configured to process magnified images of regions of interest in a tissue sample to generate data defining refined regions of interest in the tissue sample,
wherein each detection machine learning model is associated with a respective magnification level in a sequence of increasing magnification levels and is specialized to process magnified images at the associated magnification level as a result of being trained on a respective set of training examples that include magnified images at the associated magnification level; and
a controller configured to, for each magnification level in the sequence of increasing magnification levels:
image one or more regions of interest of the tissue sample at the current magnification level, comprising, for each region of interest:
using the microscope to generate a magnified image of the region of interest of the tissue sample at the current magnification level;

using the camera to capture and store the magnified image of the region of interest of the tissue sample at the current magnification level; and generating data defining one or more refined regions of interest based on the magnified image of the region of interest of the tissue sample at the current magnification level, comprising:

processing the magnified image of the region of interest of the tissue sample at the current magnification level using the detection machine learning model associated with the current magnification level to generate the data defining the one or more refined regions of interest, wherein each refined region of interest corresponds to a proper subset of the region of interest of the tissue sample, and wherein the refined regions of interest of the tissue sample provide the regions of interest to be imaged at a next magnification level from the sequence of increasing magnification levels.

2. The imaging system of claim 1, wherein each detection machine learning model is configured to generate data defining refined regions of interest corresponding to portions of the tissue sample that are predicted be cancerous.

3. The imaging system of claim 1, wherein each detection machine learning model comprises one or more neural networks.

4. The imaging system of claim 1, wherein imaging a region of interest of the tissue sample further comprises storing data defining a location of the region of interest in the tissue sample.

5. The imaging system of claim 1, wherein using the microscope to generate a magnified image of the region of interest of the tissue sample at the current magnification level comprises adjusting: (i) a position of a stage of the microscope, (ii) a magnification setting of the microscope, or (iii) both, to cause the microscope to generate a magnified image of the region of interest of the tissue sample at the current magnification level.

6. A method performed by one or more data processing apparatus which comprises, for each magnification level in a sequence of increasing magnification levels:

imaging one or more regions of interest of a tissue sample at the current magnification level, comprising, for each region of interest:

using a microscope to generate a magnified image of the region of interest of the tissue sample at the current magnification level;

using a camera to capture and store the magnified image of the region of interest of the tissue sample at the current magnification level; and generating data defining one or more refined regions of interest based on the magnified image of the region of interest at the current magnification level, comprising:

processing the magnified image of the region of interest of the tissue sample at the current magnification level using a detection machine learning model associated with the current magnification level to generate the data defining the one or more refined regions of interest, wherein the detection machine learning model associated with the current magnification level is specialized to process magnified images at the current magnification level as a result of being trained on a set of training examples that includes magnified images at the associated magnification level;

wherein each refined region of interest corresponds to a proper subset of the region of interest of the tissue sample, and wherein the refined regions of interest of the tissue sample provide the regions of interest to be imaged at a next magnification level from the sequence of increasing magnification levels.

7. The method of claim 6, wherein each detection machine learning model is configured to generate data defining refined regions of interest corresponding to portions of the tissue sample that are predicted be cancerous.

8. The method of claim 6, wherein each detection machine learning model comprises one or more neural networks.

9. The method of claim 6, wherein imaging a region of interest of the tissue sample further comprises storing data defining a location of the region of interest in the tissue sample.

10. The method of claim 6, wherein using the microscope to generate a magnified image of the region of interest of the tissue sample at the current magnification level comprises adjusting: (i) a position of a stage of the microscope, (ii) a magnification setting of the microscope, or (iii) both, to cause the microscope to generate a magnified image of the region of interest of the tissue sample at the current magnification level.

11. One or more non-transitory computer-readable storage media encoded with instructions that when executed by one or more computers cause the one or more computers to perform operations comprising, for each magnification level in a sequence of increasing magnification levels:

imaging one or more regions of interest of a tissue sample at the current magnification level, comprising, for each region of interest:

using a microscope to generate a magnified image of the region of interest of the tissue sample at the current magnification level;

using a camera to capture and store the magnified image of the region of interest of the tissue sample at the current magnification level; and generating data defining one or more refined regions of interest based on the magnified image of the region of interest at the current magnification level, comprising:

processing the magnified image of the region of interest of the tissue sample at the current magnification level using a detection machine learning model associated with the current magnification level to generate the data defining the one or more refined regions of interest, wherein the detection machine learning model associated with the current magnification level is specialized to process magnified images at the current magnification level as a result of being trained on a set of training examples that includes magnified images at the associated magnification level;

wherein each refined region of interest corresponds to a proper subset of the region of interest of the tissue sample, and wherein the refined regions of interest of the tissue sample provide the regions of interest to be imaged at a next magnification level from the sequence of increasing magnification levels.

12. The non-transitory computer-readable storage media of claim 11, wherein each detection machine learning model is configured to generate data defining refined regions of interest corresponding to portions of the tissue sample that are predicted be cancerous.

13. The non-transitory computer-readable storage media of claim 11, wherein each detection machine learning model comprises one or more neural networks.

14. The non-transitory computer-readable storage media of claim 11, wherein imaging a region of interest of the tissue sample further comprises storing data defining a location of the region of interest in the tissue sample.

15. The non-transitory computer-readable storage media of claim 11, wherein using the microscope to generate a magnified image of the region of interest of the tissue sample at the current magnification level comprises adjusting: (i) a position of a stage of the microscope, (ii) a magnification setting of the microscope, or (iii) both, to cause the microscope to generate a magnified image of the region of interest of the tissue sample at the current magnification level.

* * * * *